United States Patent [19]
Fergason et al.

[11] 3,795,133
[45] Mar. 5, 1974

[54] THICKNESS MEASURING METHOD AND APPARATUS

[75] Inventors: James L. Fergason, Kent; Thomas B. Harsch, Stow, both of Ohio

[73] Assignee: International Liquid Xtal Company, Cleveland, Ohio

[22] Filed: Feb. 15, 1972

[21] Appl. No.: 226,468

Related U.S. Application Data

[63] Continuation-in-part of Ser. No. 132,060, April 7, 1971, abandoned.

[52] U.S. Cl............................. 73/15 R, 350/160 LC
[51] Int. Cl........................................... G01n 25/00
[58] Field of Search...... 73/15, 356; 350/160 R, 160 LC; 340/228 S

[56] References Cited
UNITED STATES PATENTS

| | | | |
|---|---|---|---|
| 3,566,669 | 3/1971 | Lawrence et al. | 73/15 |
| 3,570,302 | 3/1971 | Sauer | 73/15 |
| 3,165,915 | 1/1965 | Parker et al. | 73/15 |
| 3,114,836 | 12/1963 | Fergason et al. | 250/83 |
| 2,982,856 | 5/1961 | Camp | 73/356 |
| 3,451,254 | 6/1969 | Maley | 73/15 |

Primary Examiner—Herbert Goldstein
Attorney, Agent, or Firm—Brown, Murray, Flick & Peckham

[57] ABSTRACT

Method for measuring thickness by the use of a thermal wave and cholesteric liquid crystals to detect the thermal wave. The thickness of a body (or portion of a body) is determined by covering one surface of the body with a liquid-crystal material and by abruptly changing the temperature of a medium in contact with an opposite surface of the body. The liquid crystal material has a color play temperature range, meaning that the wavelength of maximum light scattering of the liquid-crystal material will vary over a range of temperatures. By measuring the time elapse between the change in temperature of the medium on one side of the body and the occurrence of scattered light of a specific wavelength from the liquid-crystal material on the other side of the body, its thickness can be very accurately determined, taking into account the thermal diffusivity of the body. The invention is particularly adapted for, by no means limited to, use in detecting the thickness of the walls of hollow bodies, such as turbine blades.

12 Claims, 8 Drawing Figures

THICKNESS MEASURING METHOD AND APPARATUS

CROSS-REFERENCES TO RELATED APPLICATIONS

This application is a continuation-in-part of copending application Ser. No. 132,060, filed Apr. 7, 1971 and now abandoned.

BACKGROUND OF THE INVENTION

In the nondestructive testing of various machine elements, it is often desirable to have an accurate thickness measurement of walls. The problem is particularly acute in the case of hollow bodies, such as turbine blades, where the interior of the blade may be connected to the exterior through only a small passageway. In such cases, it is impossible to use mechanical measuring devices such as micrometers or calipers for determining the wall thickness of the turbine blade. A number of techniques have been used in the past such as eddy current procedures, X-ray absorption, neutron absorption and ultrasonic reflection techniques. In general, these techniques lack the accuracy required for complete dependability, making necessary a certain amount of destructive testing so that statistical methods can be used to judge whether the thickness of a given set of parts lies within specified tolerances. Needless to say, destructive testing is expensive, wasteful, and gives only a spot-check of a batch of elements without assuring the thickness of each individual element in the batch.

SUMMARY OF THE INVENTION

In accordance with the present invention, a method is provided for nondestructively measuring the thickness of elements, including the thickness of wall portion P of hollow bodies, by the use of a thermal wave and cholesteric liquid crystals to detect the thermal wave. If one side of a slab of material of finite thickness is heated or cooled to a given temperature in a very short time, it is found that the temperature of the other side changes as a function of time in such a way that it depends only on the diffusivity and thickness of the slab of material. Diffusivity of a physical property of a material which can be measured directly and is tabulated for many materials.

In carrying out the invention, the thickness of a workpiece is nondestructively determined by applying to one surface thereof a medium (e.g., a fluid) of a first predetermined temperature, and then a medium of a second preselected temperature. The opposite surface is covered with liquid-crystal material having a color play temperature range such that when light is directed onto the liquid-crystal layer, the wavelength of light which is predominantly scattered and reflected from the liquid-crystal layer will vary as the temperature of the liquid-crystal material varies. This variation in temperature, in turn, is a function of the diffusivity and thickness of the material being tested. The velocity of the thermal wave passing from one side of the body being tested to the other side containing the liquid-crystal material can be determined from a consideration of the thermal diffusivity of the body and the wavelength of scattered light. Hence, by measuring the time elapse between the initiation in a change in temperature on one side of the body and the detection of scattered light having a specific wavelength and reflected by the liquid-crystal material on the other side of the body, the thickness of the body can be determined.

For example, in order to measure the thickness of a steel pipe, a fluid medium such as water at one fixed temperature is caused to flow through the interior of the pipe, thereby insuring a constant and even temperature throughout the wall of the pipe. The exterior surface of the pipe is covered with a layer of cholesteric liquid-crystal material having a color play temperature range within which the temperature of the water flowing through the pipe falls. Then, at a predetermined time, water of a different temperature is caused to flow through the pipe while the liquid-crystal material is illuminated by light. By measuring the wavelength of light scattered from the liquid-crystal surface and by measuring the time elapse between the detection of a specific wavelength and the point at which the temperature was changed, the thickness of the pipe wall can be determined.

The liquid-crystal material can be illuminated by a source of monochromatic light or, alternatively, it can be illuminated by polychromatic light and a filter of specific wavelength interposed between the liquid-crystal film and a photomultiplier or other optical detecting device. In either case, the time elapse between the initial change in temperature and the detection of a specific wavelength can be used to determine wall thickness.

DESCRIPTION OF PREFERRED EMBODIMENTS

The above and other objects and features of the invention will become apparent from the following detailed description taken in connection with the accompanying drawings which form a part of this specification, and in which.

Figure 1:
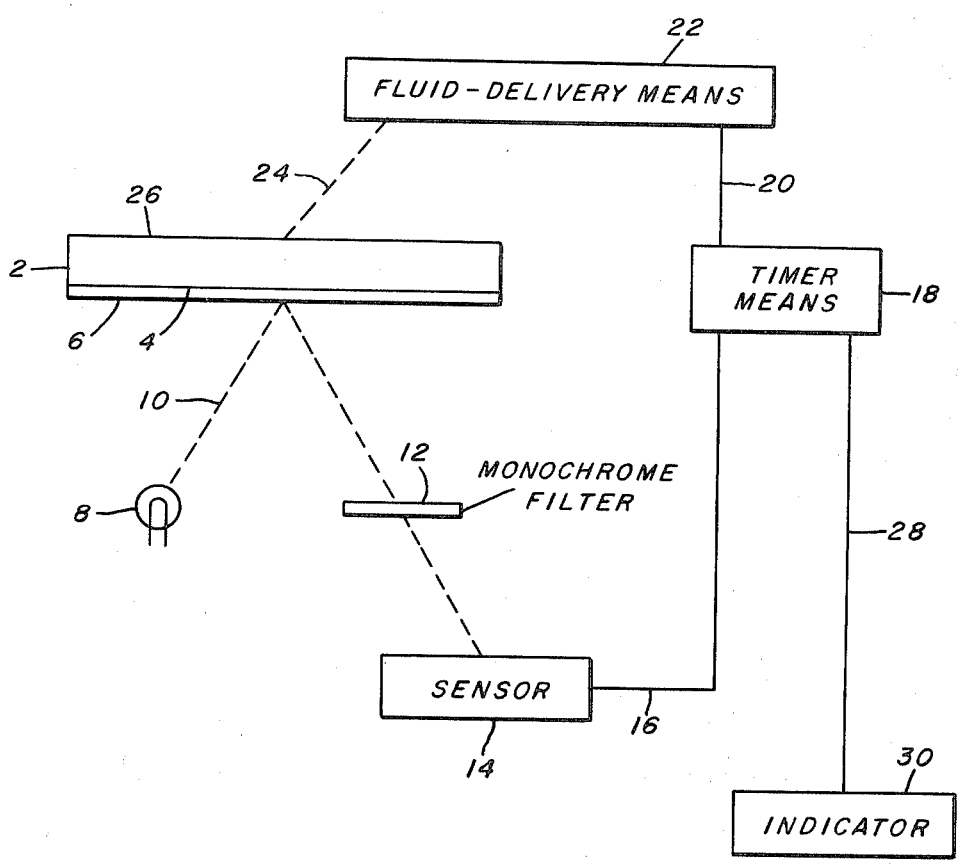
FIG. 1 is a schematic illustation of one embodiment of the invention.

With reference now to the drawings, and particularly to FIG. 1, there is indicated a piece of material 2 whose thickness is to be determined. To that end, it is provided on one surface 4 with a stratum 6 of suitable liquid-crystal material. A visible light source 8 provides light that passes as indicated at 10 to the surface 4, is reflected therefrom, and then passed through a monochromatic filter 12 to a sensor 14. Although the filter 12 can be disposed between the liquid-crystal stratum 6 and the sensor 14 as shown in FIG. 1, it should be understood that it can be disposed between the light source 8 and the stratum 6 such that the liquid-crystal material is exposed to monochromatic light only.

The sensor 14, which may comprise a photomultiplier tube, is operatively connected as indicated at 16 to a timer means 18. The timer means 18 is operatively connected as indicated at 20 to a fluid delivery means 22. The means 22 is, in essence, of such nature as to deliver fluid of a first predetermined temperature until a preselected time, at which time the means 22 commences to deliver fluid of a second temperature different from the first. Details of the means 22 are not shown in FIG. 1 since it will be appreciated that any of a great variety of arrangements can be used. One example, described in detail hereinafter, is a pair of water-supply lines, each leading from a reservoir of water of controlled temperature and containing a relay-operated valve, the pipes joining to form a line directing the water onto the surface 26. The nature of the operative connection 20 between the timer means 18 and the fluid delivery means 22 will be apparent from the foregoing. As indicated at 24, the means 22 delivers fluid of preselected and appropriate temperature to the opposite surface 26 of the piece 2. The timer means 18 may be connected, as at 28, to an indicator 30. While water is preferably used as the medium for heating or cooling the piece 2, it should be understood that other media such as gases can be used in certain cases, or any other material capable of transferring heat to the piece 2.

The apparatus of FIG. 1 can be operated as follows: The piece 2 bearing the stratum 6 of liquid-crystal material is suitably mounted so that light from the source 8 shines upon it and so that the fluid delivery means delivers fluid to the surface 26 at a first temperature for a time sufficient to insure that the piece 2 assumes throughout the same temperature as the fluid directed onto the surface 26. At a predetermined time, the timer means 18 initiates delivery of fluid of a second different temperature to the surface 26. Due to the heat wave passing through the piece 2, the temperature of the liquid-crystal stratum 6 will vary, as will wavelength of maximum scattering of light from its surface. Therefore, a short time after the change in temperature of the fluid delivered to the surface 26, the sensor 14 will become activated because of having sensed light of a preselected wavelength determined by filter 12. This signal is transmitted as at 16 to the timer means 18 which, through line 28, indicates the elapsed time on the indicator 30, this elapsed time being a function of the thickness of the piece 2.

The piece 2 may be flat and slab-like as illustrated in FIG. 1 but, as mentioned above, the invention is equally applicable to testing complicated hollow objects such as metal castings or weldments. The piece 2 may be of metal or any other material of suitable diffusivity. Diffusivity is a term that takes into account the density, the heat capacity, and the heat conductivity of the material involved. For a material of given diffusivity, and with a given temperature difference between the surfaces, there is a range of thicknesses for which the invention will operate, ranging from so thin that the elapsed time becomes impractically short to so thick that the elapsed time becomes impractically long.

When the elapsed time is short, the liquid-crystal material in stratum 6 must be more quick-responding an the timing means must have greater accuracy. When the elapsed time is long, the rate of testing (i.e., pieces per hour) suffers. In many instances, it is possible, if the elapsed time is not within a convenient range, to adjust another parameter of the process to bring it into a convenient range.

The stratum 6 may comprise any of a great variety of suitable temperature-responsive materials. In most instances, a material that changes color at or above the ambient temperature is desirable, but this is not necessarily the case. There are a great number of known kinds of liquid-crystal materials that will perform suitably. These materials are characterized by having a color play temperature range as is more fully described in an article by James L. Fergason appearing in the publication, Applied Optics, Vol. 7, page 1729, Sept. 1968.

Figure 2:
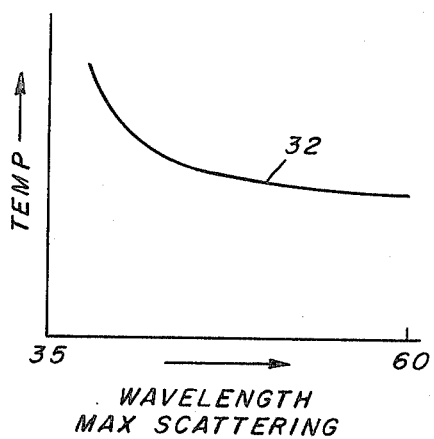
FIG. 2 is a plot of wavelength of maximum scattering of light from liquid-crystal material versus temperature, showing the color play temperature range of a typical liquid-crystal material.

For purposes of the present description, the plot of FIG. 2 can be used to illustrate the color play temperature range of a typical liquid-crystal material. Thus, as the temperature of the material decreases, and assuming that light is directed onto the material, the wavelength of maximum scattering of light from the material will vary from a minimum to a maximum as the temperature is decreased as indicated by the curve 32. Assume, for example, that the liquid-crystal stratum 6 comprises a mixture of 60 percent cholesteryl oleyl carbonate and 40 percent cholesteryl nonanoate. Assume, further, that the filter 12 is adapted to pass light having a wavelength of approximately 5,400 A°. When the timer means 18 causes the fluid delivery means 22 to deliver water of a cooler temperature, the piece 2 will begin to cool from surface 26 progressing toward surface 4. When the temperature of the surface 4 reaches that at which the liquid-crystal stratum 6 selectively scatters light in the region of 5,400°A, the sensor 14 will register an increase in response. This, then, causes the timer means to indicate the time elaspe between the initiation of the flow of cooler water onto the surface 26 and the increase in response by sensor 14. Thus, the system measures the time between the change in temperature on one side of the piece 2 and a related change in temperature on the other side of the piece. This measurement of time can be directly related to thickness, if the diffusivity of the piece 2 is shown accurately, by the basic equations of heat conduction given, for example, in *Conduction of Heat in Solids*, H.S. Carslaw and J.C. Jaeger, Clarendon Press, Oxford, 1959.

Specifically, from the temperature of the liquid from source 52 and that from source 54, the surface temperature to be detected at some time after the change in fluids can be determined from the equation:

$$T - T_H = \frac{4(T_C - T_H)}{\pi} \sum_{n=0}^{\infty} \frac{1}{(2n+1)} e^{-K(2n+1)^2 \pi^2 t/l^2} \sin \frac{(2n+1)\pi x}{l}$$

where:
- T is the surface temperature to be detected by the liquid crystal film at some time (t) after time ($t_o$).
- $T_H$ is the starting temperature uniformly distributed throughout the sample at time ($t_o$).
- $T_C$ is the cooling fluid temperature.
- l is the thickness of the workpiece.

K is the diffusivity of the material from which the workpiece is formed.

The foregoing equation is the same as equation (6) on page 96 of the aforesaid publication *Conduction of Heat in Solids*, except that $(T_C-T_H)$ has been substituted for $V_o$ and $(T-T_H)$ for V.

Thus, by knowing the temperatures $T_H$ and $T_C$ of the two fluids, the diffusivity K of the material in question, the surface temperature T indicated from the color of the liquid-crystal material and the time elapse t measured from the change in temperature to the detection of a particular color of the liquid-crystal material, the thickness of the workpiece can be computed. Assuming that the temperatures $T_H$ and $T_C$ remain constant and the diffusivity is known, a plot of time versus thickness can be drawn and thickness determined from elapsed time.

Figure 3:
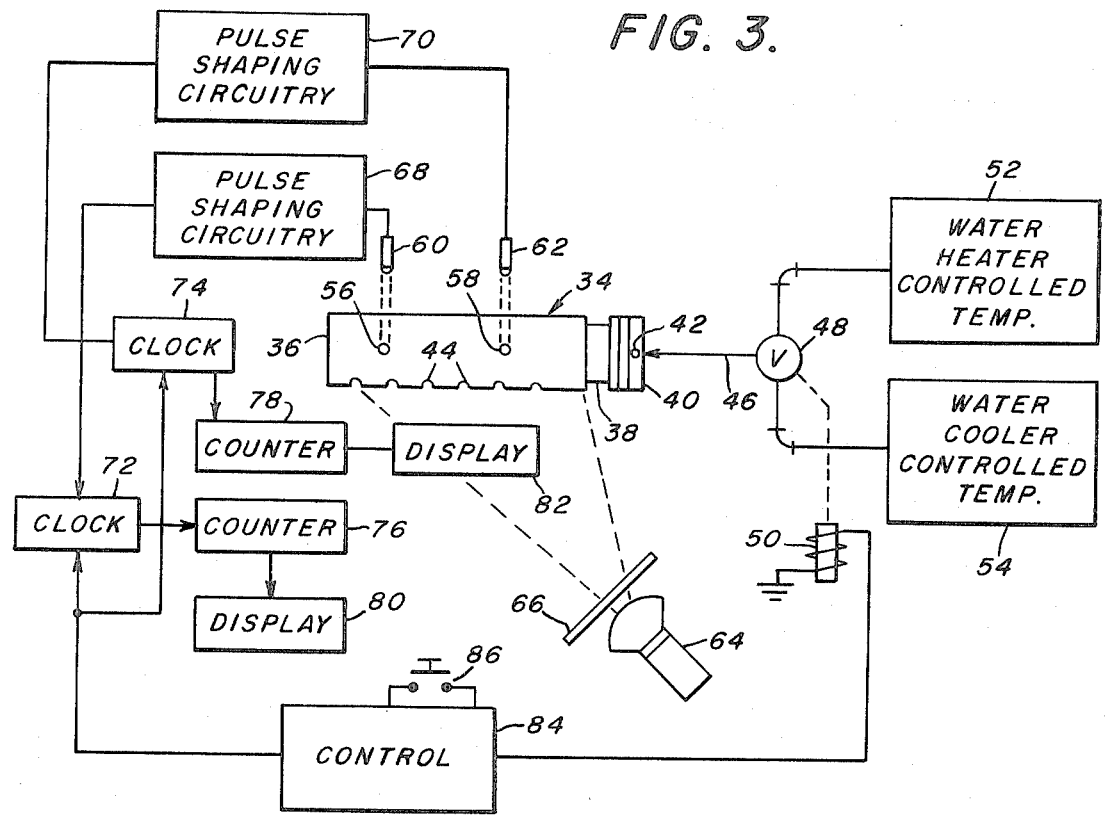
FIG. 3 is a schematic illustration of another embodiment of the invention particularly adapted for use in measuring the wall thickness of hollow bodies such as turbine blades.

With reference now to FIG. 3, a specific means for measuring the wall thickness of a hollow turbine blade at spaced points is shown. The turbine blade is indicated generally by the reference numeral 34 and has a hollow airfoil section 36 connected through a shoulder 38 to a root section 40. The root section 40 is provided with holes or passageways 42 which communicate with the hollow interior of the turbine blade. Holes 44 are provided at the trailing edge of the blade such that in actual use on a turbine, a cooling fluid can flow from the turbine rotor through the passageways 42 and into the hollow interior of the blade, thence through the holes 44 at its trailing edge.

In the testing procedure, the blade 34 is clamped between a headstock and a tailstock, not shown, the headstock being provided with means for connecting the passageways 42 in a fluid-tight connection to a conduit 46 which leads to a valve 48 operated by solenoid 50. The valve 48 is adapted to connect the conduit 46, and the interior of the turbine blade 34, to either a source of warm water 52 which is maintained at a controlled temperature or to a source of cold water 54, also maintained at a controlled temperature.

The wall thickness for the hollow turbine blade will vary; and if it is assumed that the thickness is to be determined at points 56 and 58, photomultipliers 60 and 62 are trained on the points 56 and 58. A layer of liquid-crystal material is provided over the outer surface of the turbine blade 34; and this is illuminated by a source of light from lamp 64 passing through a filter 66 such that monochromatic light only strikes the liquid-crystal film on the surface of the blade. The axis of the light beam from source 64 is preferably at an angle of 45° with respect to the surface of the blade 34 such that the first surface reflected light will not be directed towards the photomultiplier and only light selectively reflected by the liquid-crystal will be directed upwardly toward the photomultipliers 60 and 62 at an angle of 90° with respect to the surface of the blade.

The photomultipliers 60 and 62 are connected through pulse shaping circuits 68 and 70, respectively, to a pair of clocks or pulse generators 72 and 74. The clocks, in turn, are connected to counters 76 and 78, the outputs of the counters being connected to displays 80 and 82 which display the count of counters 76 and 78 in decimal form.

A control circuit 84 is provided with a pushbutton 86 such that when the pushbutton 86 is depressed, the valve 48 will disconnect the heater 52 from conduit 46 while connecting cooler 54 to conduit 46. At the same time, the control circuit 84, when pushbutton 86 is depressed, will initiate or enable clocks 72 and 74, which begin supplying pulses to counters 76 and 78. The counting action of counters 76 and 78 will continue until pulses are received from pulse shaping circuits 68 and 70 which disable the clocks 72 and 74, whereupon the counters 76 and 78 are stopped.

The pulse shaping circuits 68 and 70 will disable the clocks when the scattered light sensed by the photomultipliers reaches a predetermined wavelength, indicating a specific temperature of the liquid-crystal film on the turbine blade 34 (see FIG. 2). Thus, the displays 80 and 82 will indicate the time difference between the initial change in temperature of the fluid flowing through the turbine blade and the time at which a particular wavelength is scattered from the points 56 and 58, respectively. From this information, and from the diffusivity of the material from which the turbine blade is formed, the thickness of the wall at points 56 and 58 can be determined in accordance with the technique explained above in connection with FIG. 1.

Figure 4A:
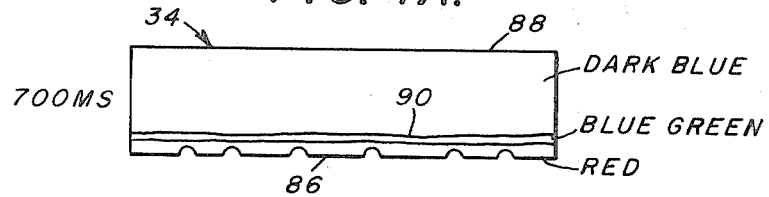
FIGS. 4A, 4B and 4C illustrate the manner in which the color pattern of liquid-crystal material on a hollow body of varying wall thickness changes progressively after change in temperature of a medium within the body.
Figure 4B:
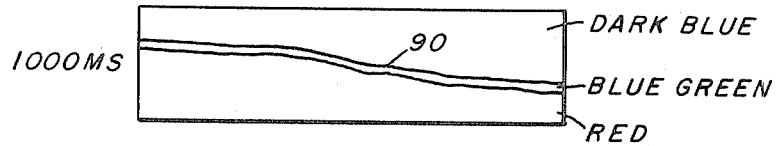
Figure 4C:
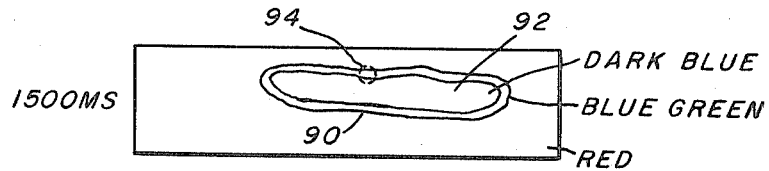

FIGS. 4A, 4B and 4C illustrate the change in color pattern of a layer of liquid-crystal material on the surface of a hollow turbine blade as a function of time, following a change in the temperature of a fluid within the blade. It is assumed that the blade is illuminated with polychromatic light. The wall thickness of the blade is a minimum at its trailing edge 86 and progressively increases toward the leading edge 88. Initially, the liquid-crystal material will appear dark blue. However, when the temperature of the fluid within the blade is changed, and due to the thinner wall thickness at the trailing edge 86, the liquid-crystal material will change along a line 90 to a blue-green color; and below the line 90 it will appear red. The condition shown in FIG. 4A occurs after a time elapse of about 700 milliseconds following the change in temperature of the fluid within the blade. At about 1,000 milliseconds and after the change in temperature, the blue-green line 90 will have advanced upwardly toward the thicker wall portion as shown in FIG. 4B. Finally, depending upon the wall thickness, the blue-green line 90 will encircle the thickest wall portion, represented by the numeral 92 in FIG. 4C. This occurs at about 1,500 milliseconds in the example given. Assuming that the thickness of point 94 is to be determined, the photomultiplier trained on point 94 will be triggered at 1,500 milliseconds. From this information, the temperature of the liquid-crystal material at 1,500 milliseconds can be determined from a curve such as that shown in FIG. 2, and this information used to calculate the thickness of the wall at point 94.

Figure 5:
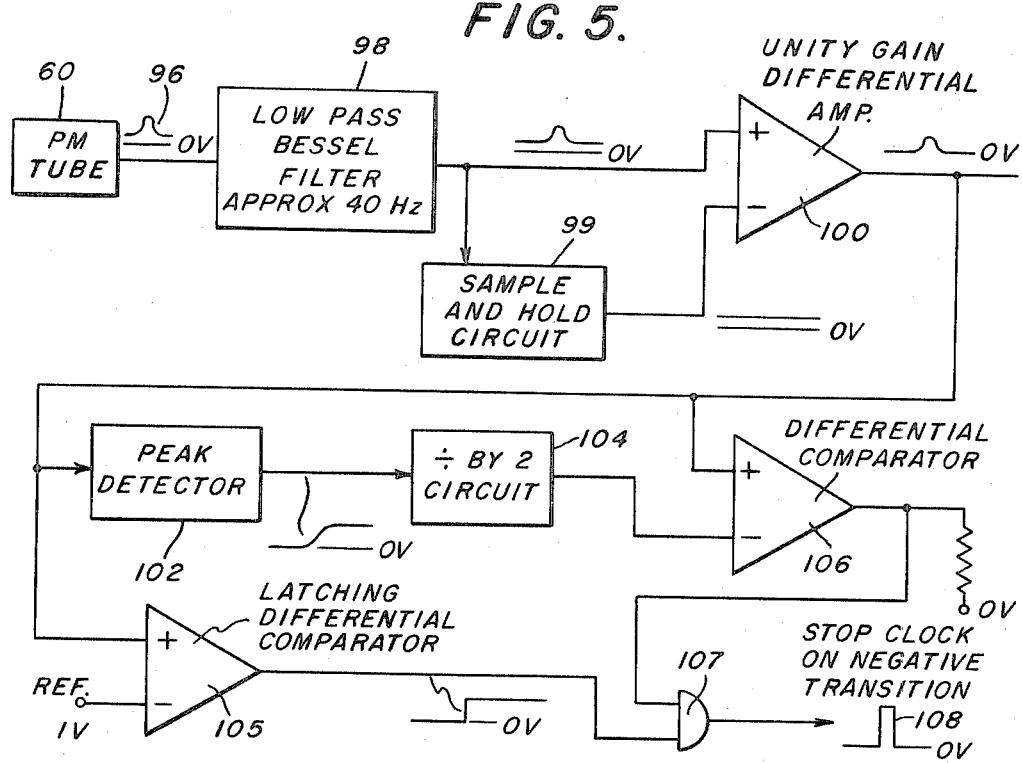
FIG. 5 is a detailed block circuit diagram of the pulse shaping circuitry used in the system of FIG. 3.

It is, of course, necessary to obtain a sharp pulse to disable the clock 72 or 74 when the blue-green line 90 passes under the point 94. For this purpose, circuitry such as that shown in FIG. 5 is provided. It includes the photomultiplier tube 60, for examle, the output of which is a pulse 96 which is passed through a low-pass filter 98 to eliminate noise components of the lamp. The monochromatic light passing through filter 66 may, for example, be in the blue-green region. Some of this light will be reflected from the liquid-crystal material and detected by the photomultiplier, even when the material beneath the tube is not blue-green. This results in a more or less constant background level of, say, 1 volt at the output of the photomultiplier tube.

The output of the low-pass filter is applied to a sample and hold circuit 99 and is also applied to one input of a unity gain differential amplifier 100. The other input to the differential amplifier 100 is the output of the sample and hold circuit 99. The sample and hold circuit samples the 1-volt background level and holds it. That is, the output of the sample and hold circuit 99 will be fixed at 1 volt for the remainder of the test. The unity gain differential amplifier 100 subtracts the 1-volt output from circuit 99 from the output of the low-pass filter 98, resulting in zero output from the amplifier 100 until a pulse arrives as a result of the liquid crystal or coating passing through a blue-green color as explained above (i.e., the blue-green band 90 of FIGS. 4A–4C passes under the photomultiplier). The effect is that the pulse is referenced to zero volts at the output of the unity gain differential amplifier. The height of this pulse is memorized by a peak detector 102; and the output of the peak detector is divided by two in circuit 104. This output is then compared with the pulse from the unity gain differential amplifier 100 in a differential comparator 106. The result is that a pulse will be produced at the output of the differential amplifier in response to a pulse at the output of amplifier 100, the leading edge of the pulse 108 occurring when the pulse from amplifier 100 reaches about one-half of its maximum value and the trailing edge occurring when the pulse from amplifier 100 again falls to one-half its maximum amplitude. Thus, there occurs at the output of differential comparator 106 a pulse which is centered with respect to the point of maximum amplitude of the pulse detected by the photomultiplier.

In order to prevent the clock from stopping until the pulse from amplifier 100 exceeds one volt, a latch circuit is provided including a latching differential comparator 105 and an AND circuit 107. The pulse from amplifier 100 is applied to comparator 105 which compares it with a reference signal of, say, one volt and produces an output to enable AND circuit 107 only when the output of amplifier 100 is at least one volt. The pulse from comparator 106 will pass through the AND circuit 107 only when it is thus enabled to produce the output pulse 108 for stopping the clock. This prevents noise signals from triggering an output pulse.

Figure 6:
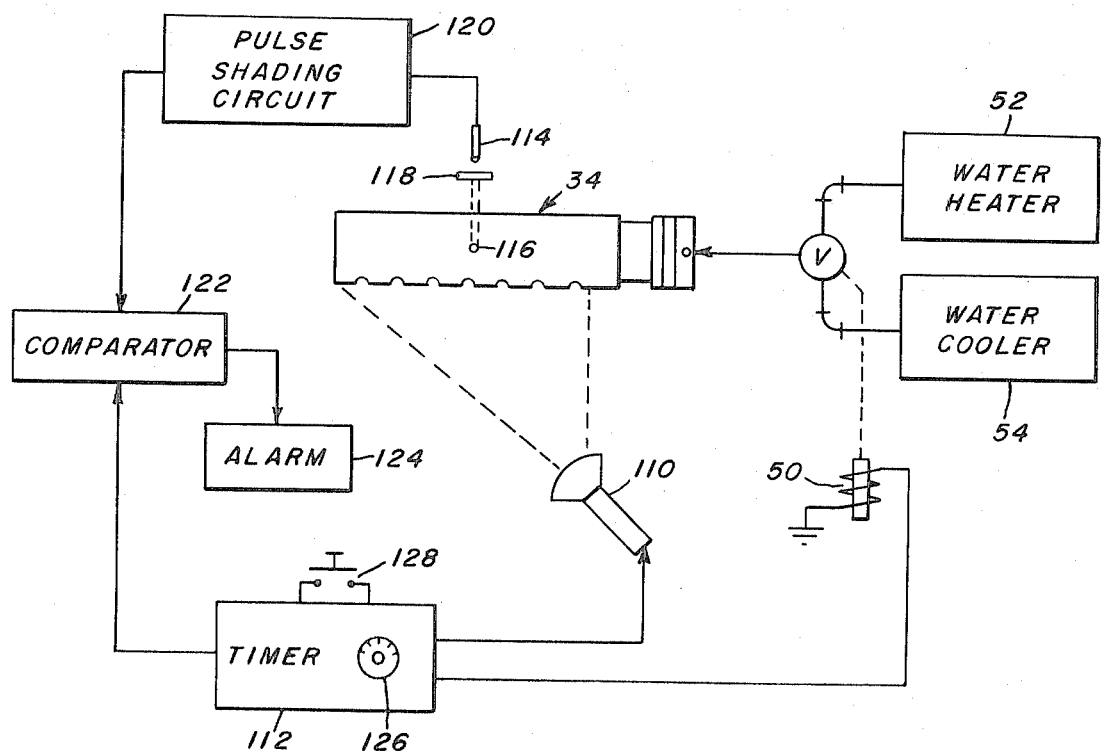
FIG. 6 illustrates another embodiment of the invention wherein a strobe light is used and is fired at a predetermined time after a change in temperature of a medium on one side of a body for determining whether the thickness of that body falls within a predetermined, desired range.

With reference now to FIG. 6, another embodiment of the invention is shown wherein elements corresponding to those of FIG. 3 are identified by like reference numerals. In like case, however, a continual source of light is replaced by means of a strobe light 110 controlled by means of a timer 112. A photomultiplier 114 is again trained on a point 116 on the turbine blade 34 and views the point 116 through a filter 118 adapted to pass blue-green light only, for example. The output of the photomultiplier 114 is passed through a pulse shaping circuit 120 to a comparator 122 where it is compared with a pulse from the timer 112. If the pulse from the photomultiplier 114 does not occur at the same time as the pulse from timer 112, the comparator will actuate an alarm 124.

In the operation of the embodiment of FIG. 6, the timer is set by means of a knob 126 to a particular time elapse, this time elapse corresponding to a specified thickness. After the timer is thus adjusted, a pushbutton 128 is depressed, whereupon the timer will immediately energize solenoid 50 to disconnect heated water source 52 from the turbine blade while connecting the cooled water source 54. At a time following energization of the solenoid 50, the timer 112 will cause energization of the strobe light 110 momentarily. At the same time, it will apply a pulse to the comparator 122. If the liquid-crystal material at point 116 appears blue-green, indicating that it is at the thickness determined by the setting of timer 112, then a pulse will be applied to the comparator 122. However, if the point 116 is not at the desired thickness, the pulse will not occur when the pulse from timer 112 occurs; and the alarm 124 will be activated, indicating that the thickness at point 116 is not at the desired value. Successive turbine blades or other workpieces can be tested in this manner on a go-no bases to determine whether the wall thickness falls within specifications.

It is also possible in accordance with the invention to illuminate the liquid crystal through fiber optics and to detect the surface temperature with the use of a fiber optics system coupled with a photomultiplier. Since the fiber optics system need be only one-eighth inch in diameter and can be within one-sixteenth inch of the surface, great accuracy in positioning of the light source and the photodetector is achieved. It is also possible to use more than one wavelength of monochromatic light, thus achieving a cross-check on the thickness measurement. Furthermore, it is possible to replace the photomultipliers with other types of photodetectors such as voltaic devices, cadmium sulfide detectors, silicon diodes and germanium diodes.

Although the invention has been shown and described in connection with certain specific embodiments, it will be readily apparent to those skilled in the art that various changes in form and arrangement of parts may be made to suit requirements without departing from the spirit and scope of the invention. In this respect, it will be appreciated that it is also possible to scan the entire workpiece, such as blade 34 of FIG. 3, with a color television camera and process data on 500 to 1,000 points on the image with a computer for a single temperature transition.

I claim as my invention:

1. A method of non-destructively determining the thickness of a piece of material having a first surface and a second and opposite surface, said method comprising the steps of:

bringing into operative association with said first surface a layer of liquid-crystal material having a color-play temperature range;

directing light energy onto said first surface with the liquid-crystal material thereon;

sensing light energy of a predetermined wavelength emitted from said first surface;

initially contacting said second surface with a medium of a first temperature and continuing the contact of said medium of said first temperature until a preselected time;

at said preselected time contacting said second surface with a medium of a second temperature within said color-play temperature range; and timing the interval between said preselected time and the time of sensing light of said predetermined wavelength scattered from said first surface due to the color-play characteristics of the liquid crystal material, said interval being an indication of the thickness of said piece.

2. A method as defined in claim 1, characterized in that said piece is metal.

3. A method as defined in claim 2, characterized in that said mediums are is a liquid.

4. A method as defined in claim 3, characterized in that said liquid is water.

5. A method as defined in claim 4, characterized in that said piece is an internally cooled gas turbine blade.

6. The method of claim 1 wherein monochromatic light is directed onto said surface.

7. The method of claim 1 wherein light is directed onto said surface continually.

8. Apparatus for nondestructively determining the thickness of a piece of material having a first surface with a color versus temperature characteristic and a second and opposite surface, said apparatus comprising, in combination
a source directing light onto said first surface,
at least one device responsive to monochromatic light of a specific wavelength emitted from said first surface,
means for contacting said second surface of said piece with a medium that is initially at a first temperature and is then, at a preselected time, changed to a second temperature and
means coupled to said device responsive to monochromatic light for timing the interval between said preselected time and the time at which said monochromatic light of specific wavelength is sensed by said device,
whereby the thickness of said piece can be determined from a consideration of the length of said time interval.

9. Apparatus as defined in claim 8 including indicating means coupled to said timing means for indicating said time interval.

10. Apparatus as defined in claim 8, characterized in that said apparatus comprises a fiber-optics bundle means having a plurality of strands in contact with said first surface and in that said means responsive to monochromatic light are responsive to monochromatic light conveyed by a plurality of different ones of said fiber-optics bundle means.

11. Apparatus as defined in claim 8, characterized in that said source of light has associated with it in the path of light traveling between said source and said means responsive to monochromatic light a filter means that passes substantially monochromatic light.

12. A method for determining whether the thickness of a piece of material having a first surface and a second and opposite surface is equal to a predetermined desired thickness, comprising:
bringing into operative association with said first surface a layer of liquid-crystal material having a color-play temperature range;
initially contacting said second surface with a medium of a first temperature and continuing the contact of said medium of the first temperature until a preselected time;
at said preselected time, contacting said second surface with a medium of a second temperature within said color-play temperature range; and
after a time interval following said preselected time, illuminating said first surface and the liquid-crystal material thereon with light while determining whether light of a specific wavelength indicative of said desired thickness is scattered from said liguid-crystal material.

* * * * *